Sept. 15, 1931.                O. FEUSSNER                1,822,989
                     INSTRUMENTAL CONTROL APPARATUS
                      Filed March 15, 1928        2 Sheets-Sheet 1

Inventor:
Otto Feussner
By [signature]
Attorney.

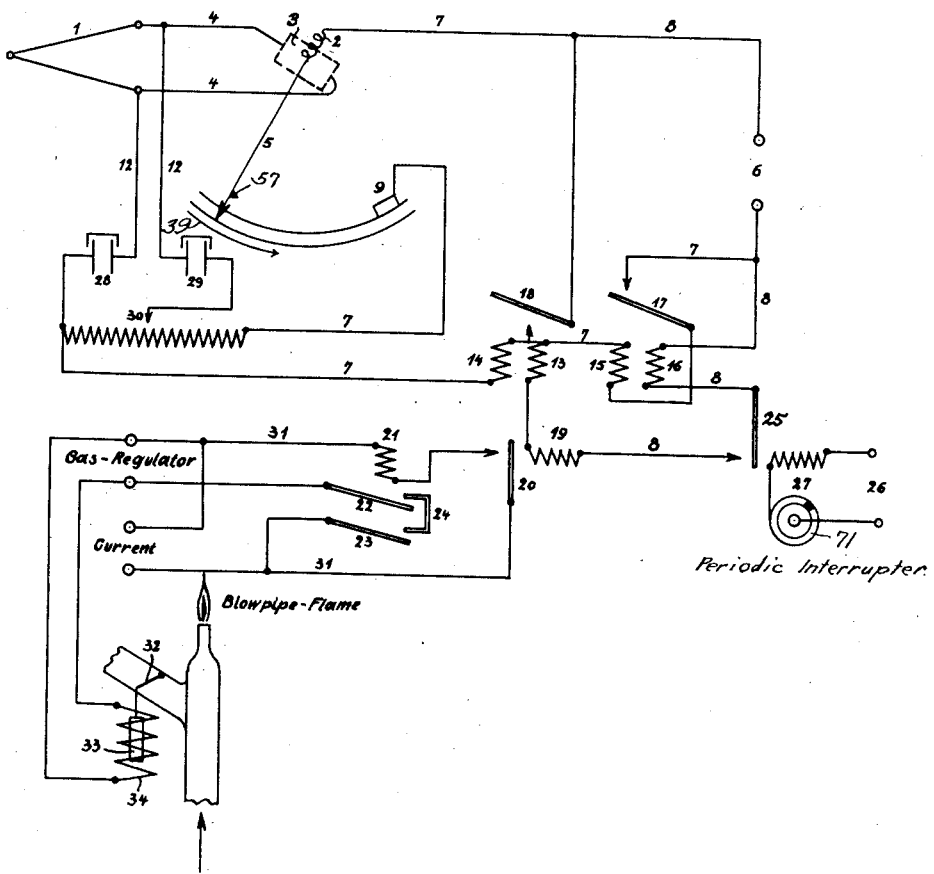

Patented Sept. 15, 1931

1,822,989

UNITED STATES PATENT OFFICE

OTTO FEUSSNER, OF HANAU-ON-THE-MAIN, GERMANY, ASSIGNOR TO THE FIRM W. C. HERAEUS GESELLSCHAFT MIT BESCHRANKTER HAFTUNG, OF HANAU-ON-THE-MAIN, GERMANY, A SOCIETY OF GERMANY

INSTRUMENTAL CONTROL APPARATUS

Application filed March 15, 1928, Serial No. 261,875, and in Germany June 3, 1927.

The invention relates to electrical regulating or control apparatus operating in conjunction with measuring, registering or indicating instruments of various kinds, actuated in whole or in part by electrical agencies. These instruments correspond closely to the ordinary measuring instruments of commerce and may, according to their type and function, deliver a small current, generated in the instrument itself, or they may utilize a source of supply outside of the instrument, as, for instance, would be the case in using a Wheatstone instrument set to determine temperature control.

The invention, as will be apparent from the above statement of its nature, has an extensive field of application. It may be utilized to regulate and control the operations and results of machines and processes, capable of being observed or determined by the effects they produce in a given instrument, ordinarily used to give observations or indications of such operations or results, and this regulation can be made entirely automatic, or may be supplemented by hand control. In all cases the purpose of the invention is to translate the calibrated indications of a measuring instrument into an effective and reliable application of control in agreement with the readings of the instrument. This control may be of temperature, pressure, or other physical state, or any result due to changes in the kinematic or static conditions of operation.

One object of the invention is to enable ordinary measuring instruments to be used to give an inexpensive, accurate and effective electrical control, or regulation, according to the calibrations of the instruments.

Another object of the invention is to equip an ordinary measuring instrument with a system of control which will permit it to be used in the control of electrical currents of considerable magnitude. Other objects and advantages of the invention will be understood as the description of the invention proceeds.

Fig. 3 shows diagrammatically the invention as used to control electrically a gaseous fuel supply.

Figure 1:
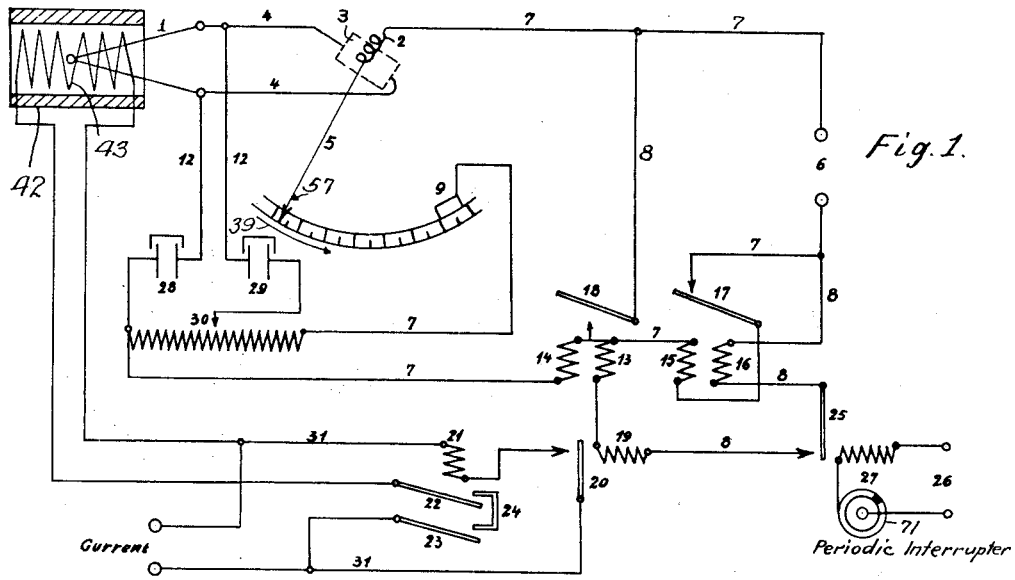
Fig. 1 shows diagrammatically electrical circuits and parts of a control system of my invention, using condensers as reactive elements, to control the operation of a furnace.

In Fig. 1 a thermo-couple is shown at 1, having leads 4 to connect it to an electrical indicating instrument coil 3. In the illustration of the invention shown in Fig. 1, the thermo-couple is used to control the temperature of a furnace 42, heated by a coil 43, but any other heat process would serve to activate the thermo-couple. This coil is the actuating element of a pointer 5, which moves along a calibrated scale carrying an adjustable contact element 9 which can be set at any scale calibration, and used to determine a limit of pointer variation and control.

The control parts shown in Fig. 1 further consist of an auxiliary circuit 7 having a shunt circuit 8, both supplied from a source 6, which may be a battery, a direct current, or an alternating current line. The circuits 7 and 8 also are provided with a pair of duplex relays 13, 14 and 15, 16 and a potentiometer coil 30 across which condensers 28, 29 have a variable connection, these condensers are used to energize leads 4 of the instrument control circuit either to assist or neutralize the actuating control current as explained below.

When the thermo-couple 1 sends a current through coil 3 to move the pointer in the direction of the arrow 39 it finally hits contact element 9 making, or closing, the auxiliary circuit 7 through contacts 57, 9. Coils 14, 15 will be then energized, opening contact 17 and closing contact 18. By this operation, circuit 7, containing the instrument contacts 57, 9, is bridged by the shunt connection 8, which acts to energize relay 19 and simultaneously discharges condensers 28, 29. During the charging operation on these condensers, their potentials will be impressed on circuit leads 4, 4, in a direction to either assist the instrument current or to check it. If the source 6 is a direct current source, an assisting polarity can be chosen, but if 6 is an alternating source, the polarity of the condensers at the instant of contact between the pointer and contact 9 will be indeterminate. But whether source 6 assists or checks the instrument current, its action will be beneficial, for, in either case, the effect will be to prevent sparking at the instrument contacts. In any event, the contact need only be momentary to give the desired control, because as soon as the instrument current and the condenser current act together they close shunt 8, which immediately energizes relay 19 to cause it to cut off the power current or effect other control according to the nature of the process heating the thermo-couple.

As soon as relay 18 is closed shunt circuit 8 operates relay contact 20 to cause the circuit breaker 24 to open the furnace heating, or power current, supposing relay contact 25 to be closed. The last mentioned contact 25 is operated by a time controlled switch mechanism in circuit 26, the purpose of which is to cause the periodic opening and closing of the relay 19, 20 actuating circuit, to ensure that the operation of the circuit breaker 24 remains wholly under the control of the instrument pointer by sending periodic reactive impulses across the control contacts, thus overcoming any tendency to stick, or freeze, in any given control position. This effect will be understood from the following considerations.

After the shunt circuit 8 has been established, contact 17 is open, and contact 18 closed. Suppose then pointer 5 retraces its movement, due to a cooling of the furnace, opening contacts 57 and 9. This should immediately result in a reversal of the relative positions of contacts 17 and 18, but at times on certain classes of work, where the control is delicate, one or the other may stick. In such a contingency, relay 19 will be momentarily de-energized by the periodic opening and closing of its circuit by the time-controlled switch mechanism 26, thus allowing the heating current to go on again. If contacts 17 and 18 are functioning correctly, no harm will be done by this temporary interruption in the relay circuit, because as long as the pointer keeps its contact closed it will always send contacts 17 and 18 to their right positions. If, on the other hand, the furnace has cooled to any extent because contacts 17 and 18 have stuck, or either of them, then the pointer backs away from its contact and the power current remains on until the control cycle is again instituted by a hot furnace condition. Furthermore, the shock introduced into the system by periodically opening and closing the time switch tends to shake loose any slight sticking of contacts 17 and 18.

Figure 2:
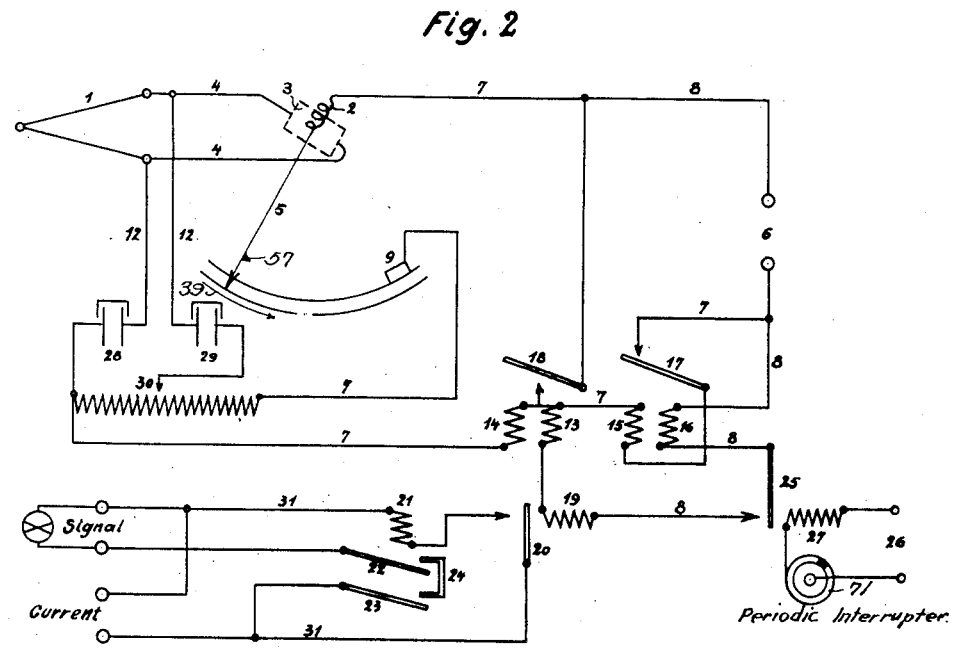
Fig. 2 is a diagram similar to Fig. 1 but showing the invention as applied in signal operations.

The forms of the invention shown in Figs. 2 and 3 are operatively the same as in Fig. 1 as regards the coaction between the instrument circuit 4, 4, and the auxiliary circuit 7, but the application in Fig. 2 is to give some kind of signal, while in Fig. 3 the final control is directed to regulate the flow of gas to a blow pipe operation. These modifications illustrate the adaptability of the invention to either give a signal, calling for manual control of a process, Fig. 2, or, as in Fig. 3, the invention can be used to effect an energy control different than that shown in Fig. 1.

It will be apparent that the features of the invention disclosed enable the microscopic currents of a thermo-couple to effectively control the operating switch parts of a power circuit in accordance with changes of temperature taking place in the vicinity of the thermo-couple, but other measuring instruments may be substituted for the thermo-couple, responsive to other than heat changes, and various kinds of energy sources may replace the ones shown in Figs. 1, 2 and 3, according to any special manufacturing process, as will be evident to those skilled in the art.

What I claim as my invention is:—

1. In an industrial process control device, electrical instrumental means, including a stationary contact and a movable contact, responsive to energy changes in a given process operation, by variations of the current of said instrumental means, in combination with a source of alternating current power, and a capacity circuit means connected between said instrumental means and said source of power, whereby said variations of said instrumental current, either momentarily augment, or momentarily decrease the control effect of said instrumental current acting through said contacts by superposing said alternating source of power on the instrumental current variation, thereby causing the contact making effect of said instrumental means to be either greatly increased, or practically eliminated.

2. An electrical instrumental circuit control system comprising a measuring instrument provided with a movable pointer responsive to variations in physical states or conditions affecting the instrument, a stationary contact element associated with the said instrument pointer, a control circuit connected between said pointer and said element containing condensive reactive devices and a source of E. M. F. in combination with a shunt circuit bridging said source through a relay switch mechanism connected in said control circuit and an instrument circuit actuating said pointer and connected to the control circuit through the said condensive reactive devices, whereby the control circuit cooperates with the instrument circuit in establishing good electric contact between the pointer and its associated contact.

3. In an electric instrument control apparatus, an instrument provided with a pointer and a control contact, an instrument circuit responsive to changes in physical states or conditions, as measured by the instrument, a control circuit connected to the instrument circuit through series connected condensers, and to the instrument pointer and control contact by terminal connections, a shunt connection, containing a control device, connected across said control circuit through a relay mechanism connected in the control circuit and a supplemental circuit means designed to periodically open and close said control circuit.

4. In an electrical control apparatus, an instrumental control system comprising an electrical measuring instrument provided with a pointer and a contact co-operating therewith, a control circuit, including a potentiometer and a relay mechanism, connected between the pointer and contact, series connected condensers connected across the potentiometer and through intermediate connections with the instrument circuit of said measuring instrument, whereby the circuit control established through the operation of said instrument pointer and contact is jointly effected by energy from the instrument circuit and the control circuit.

In testimony whereof I affix my signature.

OTTO FEUSSNER.